(12) United States Patent
Igl et al.

(10) Patent No.: US 12,115,853 B2
(45) Date of Patent: Oct. 15, 2024

(54) ELECTRIC VEHICLE TRANSMISSION

(71) Applicant: ZF Friedrichshafen AG, Friedrichshafen (DE)

(72) Inventors: Stefan Igl, Vilshofen (DE); Thomas Oberbuchner, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/934,742

(22) Filed: Sep. 23, 2022

(65) Prior Publication Data

US 2023/0103790 A1    Apr. 6, 2023

(30) Foreign Application Priority Data

Oct. 6, 2021    (DE) .................. 10 2021 211 267.6

(51) Int. Cl.
*B60K 17/08*    (2006.01)
*B60K 1/02*    (2006.01)
(Continued)

(52) U.S. Cl.
CPC ............... *B60K 17/08* (2013.01); *B60K 1/02* (2013.01); *B60K 17/344* (2013.01);
(Continued)

(58) Field of Classification Search
CPC ........ B60K 17/08; B60K 1/02; B60K 17/344; B60K 17/356; B60K 17/28;
(Continued)

(56) References Cited

U.S. PATENT DOCUMENTS

2014/0349799 A1* 11/2014 Kaltenbach ............ B60K 6/365
                                                                  475/5
2021/0129665 A1*  5/2021 Kumar .................. F16H 37/041
(Continued)

FOREIGN PATENT DOCUMENTS

DE    10 2017 216 492 A1    1/2019
DE    10 2018 215 942 A1    3/2020
(Continued)

OTHER PUBLICATIONS

German Patent Office, Search Report issued for German patent application No. 10 2021 211 267.6 (May 10, 2022).

*Primary Examiner* — Jacob S. Scott
*Assistant Examiner* — Farhana Pervin
(74) *Attorney, Agent, or Firm* — Finch & Maloney PLLC

(57) ABSTRACT

An electric vehicle transmission has a first driveshaft configured to be coupled to a first electric machine, and a main drive output shaft configured to be coupled to at least one drive axle. At least one gear-shifting element is provided, which when respectively actuated enables the first driveshaft and the main drive output shaft to be coupled to one another by way of a gear. The transmission can be provided in an electric vehicle in which electric machines can be integrated to provide drive power and to operate an auxiliary drive output. In addition, a second driveshaft serves to be coupled to a second electric machine and which can be coupled to an auxiliary driveshaft. In this case a shifting element is present, which when actuated couples the second driveshaft with the main drive output shaft. A method of operating an electric utility vehicle drive system is also disclosed.

15 Claims, 7 Drawing Sheets

(51) Int. Cl.
  *B60K 17/344* (2006.01)
  *B60K 17/356* (2006.01)
  *F16H 37/08* (2006.01)
  *F16H 61/688* (2006.01)
  *B60K 17/28* (2006.01)

(52) U.S. Cl.
  CPC ....... *B60K 17/356* (2013.01); *F16H 37/0806* (2013.01); *F16H 61/688* (2013.01); *B60K 17/28* (2013.01); *F16H 2200/0021* (2013.01)

(58) Field of Classification Search
  CPC .............. F16H 37/0806; F16H 61/688; F16H 2200/0021; F16H 2200/0039; F16H 3/089; F16H 3/0915
  See application file for complete search history.

(56) References Cited

U.S. PATENT DOCUMENTS

| | | | |
|---|---|---|---|
| 2021/0379978 A1* | 12/2021 | Van Dingenen | B60K 25/06 |
| 2022/0032755 A1 | 2/2022 | Seemann et al. | |
| 2022/0186467 A1 | 6/2022 | Bebeti et al. | |
| 2023/0069392 A1* | 3/2023 | Brolles | B60W 10/08 |

FOREIGN PATENT DOCUMENTS

| | | |
|---|---|---|
| DE | 10 2019 203 724 A1 | 9/2020 |
| WO | 2019/015811 A1 | 1/2019 |
| WO | 2020/197463 A1 | 10/2020 |

\* cited by examiner

ELECTRIC VEHICLE TRANSMISSION

RELATED APPLICATIONS

This application claims the benefit of and right of priority under 35 U.S.C. § 119 to German Patent Application no. 10 2021 211 267.6, filed on 6 Oct. 2021, the contents of which are incorporated herein by reference in its entirety.

FIELD OF THE DISCLOSURE

The invention relates to an electric vehicle transmission for an electric utility vehicle, wherein the electric vehicle transmission comprises a first driveshaft designed to be coupled to a first electric machine, and a main drive output shaft which serves to be coupled to at least one drive axle, wherein at least one gear-shifting element is provided, by the respective actuation of which the first driveshaft and the main drive output shaft can be coupled to one another, with a respective gear between them. In addition, the invention relates to a drive system for an electric utility vehicle, an electric utility vehicle and a method for operating a drive system.

BACKGROUND

In the case of electric vehicles drive systems are known, which often consist of at least one electric machine and a downstream multi-gear transmission. In such cases various gears can be engaged in the multi-gear transmission concerned, in order convert a drive input movement of the at least one electric machine with various gear ratios and thereby, in combination with the electric machine, to obtain higher top speeds of the electric vehicle and/or to enable the electric machine to operate in a high-efficiency range.

DE 10 2017 216 492 A1 describes an electric vehicle transmission for an electric vehicle, which can be an electric utility vehicle. The electric vehicle transmission comprises a driveshaft that serves to connect an electric machine, wherein by the selective actuation of a number of gear-shifting elements and the engagement of various gears, the driveshaft can be coupled to a main drive output shaft. In this case, the main drive output shaft is provided for coupling to a drive axle of the electric vehicle.

SUMMARY

Starting from the prior art described above, it is now the purpose of the present invention to provide an electric vehicle transmission with which a plurality of electric machines can be suitably combined to drive a utility vehicle and to operate an auxiliary drive of the utility vehicle.

This objective can be achieved in combination with features disclosed herein. The present disclosure also relates to a drive system in which an electric vehicle transmission is used is as well as an electric utility vehicle with a drive system. Finally, this disclosure relates to a method for operating a drive system.

According to the invention, the electric vehicle transmission comprises a first driveshaft designed to be coupled to an electric machine, and a main drive output shaft which serves to be coupled to at least one drive axle. Furthermore at least one gear-shifting element is provided, by the selective actuation of which the first driveshaft and the main drive output shaft can be coupled to one another by way of a gear.

In the context of the invention a "shaft" is understood to be a rotating component of the electric vehicle transmission by way of which a power flow between components can be produced, if necessary, with simultaneous actuation of a corresponding shifting element or gear-shifting element. The shaft concerned can connect components axially or radially or even both axially and radially to one another. Thus, the shaft concerned can also constitute an intermediate element by way of which a particular component of the electric vehicle transmission can be connected, for example radially.

In the context of the invention "axial" means an orientation in the direction of a longitudinal central axis of the electric vehicle transmission, such that rotation axes of the shafts of the transmission are arranged parallel to the said central longitudinal axis. "Radial" is then understood to be an orientation in the diametric direction of a component of the transmission.

In the electric vehicle transmission according to the invention, the first driveshaft is provided in order to produce a drive input side connection to a first electric machine when the electric vehicle transmission has been installed. For that purpose, the first driveshaft is in particular provided with a connection area to which a coupling of the first driveshaft to a rotor of the first electric machine can be formed. In the context of the invention there can in that case be provided, if appropriate, at least one further gear ratio step between the first driveshaft and the rotor of the first electric machine, such as a spur gear stage and/or a planetary stage, by way of which a pre-gear ratio of a rotary movement of the rotor of the first electric machine relative to the first driveshaft can be obtained. Particularly preferably, however, the rotor of the first electric machine is solidly connected to the first driveshaft of the electric vehicle transmission according to the invention, so that the said rotor and the said first driveshaft rotate at the same speed during operation.

Furthermore, in the electric vehicle transmission according to the invention the main drive output shaft is designed such that in the installed condition of the electric vehicle transmission the said shaft forms a permanent coupling with at least one drive axle of the electric utility vehicle. Accordingly, in the installed condition of the electric vehicle transmission drive power can be produced in a drive-train of the electric utility vehicle, since within the electric vehicle transmission a power flow is imposed on the main drive output shaft and so also farther on, to the at least one drive axle.

To create such a power flow the main drive output shaft can be coupled to the first driveshaft, which can be done in at least one gear of the electric vehicle transmission by actuating in each case an associated gear-shifting element. Correspondingly, at least one gear ratio can be engaged between the first driveshaft and the main drive output shaft, and in order to engage the said gear ratio at least one associated gear-shifting element has to be actuated in each case.

The invention now includes the technical principle that in addition a second driveshaft is provided, which is coupled to a second electric machine and can be coupled to an auxiliary driveshaft. Furthermore, a shifting element is present, which when actuated couples the second driveshaft to the main drive output shaft. In other words, besides the first driveshaft the electric vehicle transmission according to the invention has a second driveshaft which is coupled to a further, second electric machine. This second driveshaft can be coupled to an auxiliary driveshaft so that a coupling between the second electric machine and the auxiliary driveshaft is also formed. Moreover, the second driveshaft can still be coupled to the main drive output shaft by actuating a shifting element.

Such a design of an electric vehicle transmission has the advantage that consequently, in the installed condition of the electric vehicle transmission, on the one hand by coupling the second driveshaft to the auxiliary driveshaft a power take-off can be powered by the second electric machine. In that way, in an electric utility vehicle a working device connected to the auxiliary drive can be powered. On the other hand, however, the second driveshaft and thus also the second electric machine connected to it can also be coupled to the main drive output shaft, so that power can flow from the second driveshaft to the main drive output shaft. Consequently, drive power can be provided by the second electric machine alone, or the second electric machine can be used to support the first electric machine. Thus, all-in-all an electric vehicle transmission can be produced in which, in a suitable manner, more than one electric machine can be used for driving an electric utility vehicle and also for operating an auxiliary drive of the utility vehicle.

The auxiliary driveshaft of the electric vehicle transmission according to the invention serves to form a connection to an auxiliary drive of the electric utility vehicle, wherein, in the installed condition of the electric vehicle transmission, the said connection is preferably in the form of a permanent coupling. In particular, the auxiliary driveshaft is permanently coupled to a power take-off shaft by way of at least one gear ratio, producing a rotationally fixed connection to various power take-off shaft stubs for the connection of various working devices of the utility vehicle. Particularly preferably, between the power take-off shaft and the auxiliary driveshaft a permanent coupling is formed by way of an intermediate spur gear stage consisting of a spur gear attached rotationally fixed to the auxiliary driveshaft and a spur gear attached to the power take-off shaft, these spur gears meshing permanently with one another. In the context of the invention, however, between the auxiliary driveshaft of the electric vehicle transmission according to the invention and the power take-off shaft an additional power take-off shaft transmission could also be provided, by means of which various gear ratios can be engaged for transmitting a rotation movement from the auxiliary driveshaft to the power take-off shaft.

The auxiliary driveshaft can preferably be coupled to the second driveshaft by means of a further shifting element, which in its actuated condition forms the coupling between the second driveshaft and the auxiliary driveshaft. Particularly preferably, a rotationally fixed connection between the second driveshaft and the auxiliary driveshaft is formed thereby.

In the electric vehicle transmission according to the invention the second driveshaft serves to form a drive-side connection with the second electric machine. For that purpose, the second driveshaft is in particular provided with a connection section on which a coupling between the second driveshaft and a rotor of the second electric machine can be formed. In the context of the invention, between the second driveshaft and the rotor of the second electric machine at least one further gear ratio can be provided, such as a spur gear stage and/or a planetary stage. By way of the said at least one further gear ratio a pre-gear ratio of a rotation movement of the rotor of the second electric machine relative to the second driveshaft is produced. Particularly preferably, however, in the installed condition of the electric vehicle transmission the second driveshaft of the electric vehicle transmission according to the invention and the rotor of the second electric machine are connected permanently with one another so that during operation the rotor and the second driveshaft rotate at the same speed.

Preferably, the second driveshaft is permanently connected to at least one pump drive of a pneumatic or hydraulic system, so that the second driveshaft is permanently coupled to a respective pump driveshaft of the at least one pump drive. Particularly preferably, this permanent coupling is created by way of at least one spur gear stage between the second driveshaft and a respective pump driveshaft.

In accordance with an embodiment, when actuated the shifting element connects the second driveshaft rotationally fixed to a first spur gear which meshes with a second spur gear, the said second spur gear being coupled to the main drive output shaft. In that way the coupling between the second driveshaft and the main drive output shaft can be formed in a reliable manner, and the spur gear stage formed by the first and second spur gears can also have a suitable gear ratio for transmitting a rotation movement from the second driveshaft to the main drive output shaft. Particularly preferably, the second spur gear is connected rotationally fixed to the main drive output shaft.

Alternatively, the said embodiment can also be modified in that of the two spur gears, one spur gear is permanently coupled to the second driveshaft whereas the respective other spur gear is mounted rotatably on the main drive output shaft but can be fixed on it by means of the shifting element. As another alternative in the context of the invention, it is also conceivable that when actuated the shifting element forms a rotationally fixed and solid connection between the second driveshaft and the main drive output shaft or, however, that on actuating the shifting element a plurality of gear ratio steps are obtained for the coupling between the second driveshaft and the main drive output shaft. These various gear ratio steps can individually take the form of spur gear stages or planetary stages. Finally, a coupling between the second driveshaft and the main drive output shaft can also be produced by a planetary stage when the shifting element is actuated.

According to a possible design of the invention, the shifting element is combined with a further shifting element to form a shifting device, by the actuation element of which, from a neutral position, on the one hand the shifting element and on the other hand the said further shifting element can be changed to a respectively actuated condition, wherein when it is actuated the further shifting element couples the second driveshaft and the auxiliary driveshaft to one another. This has the advantage that the number of actuating actuators in the electric vehicle transmission according to the invention can be reduced, since by means of a common actuating actuator the shifting element and the further shifting element can be actuated alternatively. In this case, particularly preferably, a rotationally fixed and solid connection between the second driveshaft and the auxiliary driveshaft is formed, these being positioned coaxially with one another for that purpose.

In a further embodiment of the invention a first gear-shifting element, when actuated, connects the first driveshaft rotationally fixed to the main drive output shaft, and in addition at least one further shifting element is present, in the closed condition of which a power flow is created from the first driveshaft via a countershaft to the main drive output shaft by way of associated spur gear stages and in the associated gear concerned. Thus, advantageously, in that way, by actuating the first gear-shifting element a solid straight-through drive from the first driveshaft to the main drive output shaft can be created, wherein the first driveshaft and the main drive output shaft can be coupled to one another in at least one further gear and by actuating at least one further gear-shifting element.

In a further development of the above embodiment, a second gear-shifting element and a third gear-shifting element are provided, and the countershaft is coupled permanently by a first spur gear stage to the first driveshaft, whereas when the second gear-shifting element is actuated the countershaft can be coupled to the main drive output shaft via a second spur gear stage and by closing the third gear-shifting element it can be coupled to the main drive output shaft via a third spur gear stage. Thus, in this variant of the invention three different gears can be engaged between the first driveshaft and the main drive output shaft, one of those gears being a solid straight-through drive. In the other two gears there is in each case a power flow starting from the first driveshaft, by way of a countershaft, to the main drive output shaft. Whereas the countershaft is permanently coupled to the first driveshaft by the first spur gear stage, the countershaft can be coupled to the main drive output shaft either via a second spur gear stage by closing the second gear-shifting element, or via the third spur gear stage by closing the third gear-shifting element.

However, the above-described further development could also be modified in such manner that the countershaft is permanently coupled to the main drive output shaft by a spur gear stage, and can be connected to the first driveshaft via a spur gear stage by actuating a gear-shifting element and via another spur gear stage by closing another gear-shifting element. In general, in the context of the invention further spur gear stages could also be provided, by way of which, in each case by actuating a respectively associated gear-shifting element, a power flow between the first driveshaft and the main drive output shaft can be produced.

In the further development described, a first gear is obtained between the first driveshaft and the main drive output shaft by closing the second gear-shifting element, and a second gear between the first driveshaft and the main drive output shaft can be engaged by actuating the third gear-shifting element. In addition, a third gear between the first driveshaft and the main drive output shaft can be obtained by closing the first gear-shifting element, and this third gear is then a direct gear with a solid through-drive. In the installed condition of the electric vehicle transmission these gears can in each case be used for a drive input and also for braking (recuperation) of the electric utility vehicle via the first electric machine by virtue of a power flow between the first driveshaft and the main drive output shaft, and thus the at least one drive axle connected thereto. Particularly preferably, a drive input can also be produced in a further gear which is engaged between the second driveshaft and the main drive output shaft, by closing the shifting element. In this further gear an exclusive drive input or an exclusive braking can take place via the second electric machine connected to the second driveshaft.

In particular the first gear-shifting element, the second gear-shifting element and the third gear-shifting element are combined in a shifting device whose actuation element, besides a neutral position, can be positioned in other shift positions of which each individual one is associated with a respective actuation of one of the gear-shifting elements. In that way an actuation of the three gear-shifting elements is realized by means of a common actuating system, which reduces the manufacturing costs of the electric vehicle transmission. Besides the neutral position the actuation element of the shifting device can be positioned in a first shift position, in a second shift position and in a third shift position, such that in the first shift position the first gear-shifting element, in the second shift position the second gear-shifting element and in the third shift position the third gear-shifting element is actuated.

In a further development of the invention, the countershaft is arranged coaxially with the second driveshaft. Advantageously, a radially more compact structure of the electric vehicle transmission can be produced.

In accordance with an embodiment of the invention, the individual shifting element and/or the individual gear-shifting element is in the form of an interlocking shifting element, preferably a claw-type shifting element. Such a design of the respective shifting element or the respective gear-shifting element has the advantage that in an open condition no, or almost no drag losses prevail. Alternatively, however, the interlocking shifting element could be in the form of a locking synchronization unit. A further alternative is to design one or more shifting elements, or one or more gear-shifting elements as frictional shifting elements, particularly in the form of disk shifting elements.

According to a further possible design of the invention, the main drive output shaft is coupled to a transverse differential. This coupling is preferably made in that the main drive output shaft is connected directly to an input side of the transverse differential. Particularly preferably, the transverse differential is in the form of a bevel gear differential, wherein the main drive output shaft carries a bevel gear which meshes with a drive-side adjustment wheel of a differential cage of the bevel gear differential.

Alternatively, preferred to but also supplementing the above-described design option, the main drive output shaft can be coupled to a driveshaft by way of a separator clutch, which serves to form a coupling with at least one further drive axle. In that way a further drive axle can be brought into connection in a simple manner and thereby an all-wheel drive or multi-axle drive of the electric utility vehicle can be realized.

An electric vehicle transmission made in accordance with one or more of the above-mentioned variants is in particular part of a drive system for an electric utility vehicle, this drive system then also comprising a first electric machine and a second electric machine. Whereas a rotor of the first electric machine of the electric vehicle transmission is coupled to the first driveshaft, the rotor of the second electric machine is connected to the second driveshaft of the electric vehicle transmission. Thus, the two electric machines can both be operated on the one hand as an electric motor and on the other hand as a generator, wherein the electric machine concerned in its electric motor mode of operation, by virtue of a supply of current, itself produces a corresponding drive input movement whereas when operating as a generator each electric machine, by driving the rotor, generates a current. By means of the said drive system, the electric utility vehicle can be powered by the first electric machine, while in addition or alternatively, a drive movement can be supplied via the second electric machine, since the second driveshaft is coupled with the main drive output shaft of the electric vehicle transmission by actuating the shifting element. The second electric machine can also be used to power the auxiliary drive by being coupled with the auxiliary driveshaft.

A further objective of the invention is an electric utility vehicle, in particular an electric working vehicle. Particularly preferably, this working vehicle is an agricultural or forestry working vehicle. It can in particular be in the form of a tractor. Furthermore, the electric working vehicle can be a building machine. In each case the electric utility vehicle is equipped with a drive system according to one or more of the variants described above.

The invention also relates to a method for operating a drive system of the above type, wherein the at least one gear-shifting element of the electric vehicle transmission is actuated and thereby the first electric machine is coupled to the main drive output shaft by way of the associated gear in each case. In the course of coupling the first electric machine to the main drive output shaft in the associated gear, in addition the shifting element is actuated and thereby the second shifting element is also coupled to the main drive output shaft. In that way the second electric machine can be connected to play a supporting role, so that the drive torque produced at the main drive output shaft can be increased. In the course of a braking process, in the same way but with both electric machines operating as generators, a braking torque by virtue of recuperation can be increased.

In a further development of the above-mentioned method, in the course of coupling the first electric machine to the main drive output shaft in the associated gear and from the time when the shifting element is actuated, the second electric machine is actuated in such manner that by the second electric machine, a rotation-speed-synchronous drive torque is contributed to the main drive output shaft. In that way an additional provision of a drive torque can be realized in a particularly advantageous manner.

In the electric vehicle transmission, between the first driveshaft and the main drive output shaft various gears can be engaged by the selective actuation in each case of one of several gear-shifting elements, so in the course of a change between the gears that can be obtained between the first electric machine and the main drive output shaft and the necessary shift between the gear-shifting elements, the shifting element is closed, whereupon a traction force is reinforced by the second electric machine. Advantageously, in this way a change between the gears which, respectively, can be engaged between the first driveshaft and the main drive output shaft of the electric vehicle transmission, can be carried out without or almost without traction force interruption since during the course of the gearshift concerned the traction force is supported by the second electric machine, which is connected to the main drive output shaft via the second driveshaft. For this the shifting element is closed, and in the context of the invention this is understood to mean that it is additionally actuated for the gearshift or, however, kept in an already actuated condition.

The invention is not limited to the combination of features indicated in the principal claim or the claims that depend on it. There are further options for combining individual features with one another, provided that they emerge from the claims, the following description of a preferred embodiment of the invention, or directly from the drawings. References in the claims to the drawings, by the use of indexes, are not intended to limit the protective scope of the claims.

BRIEF DESCRIPTION OF THE DRAWINGS

An advantageous embodiment of the invention, which is explained below, is illustrated in the drawings, which show.

DETAILED DESCRIPTION

Figure 1:
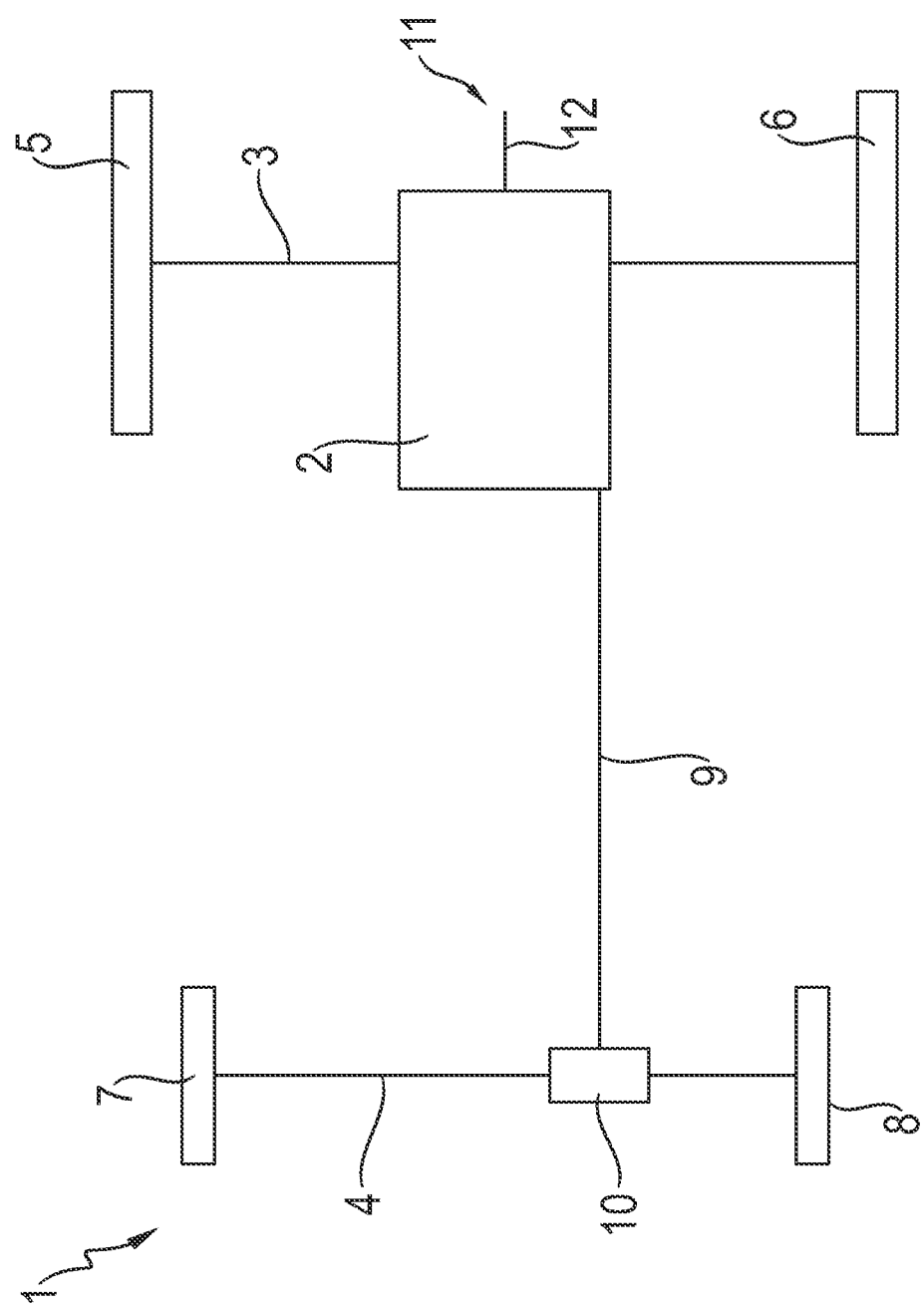
FIG. 1: A schematic view of a drive-train of an electric utility vehicle.

FIG. 1 shows a schematic view of a drive-train 1 of an electric utility vehicle, which vehicle is an electric working vehicle. Particularly preferably, this electric utility vehicle is an electrically driven tractor. The drive-train 1 comprises a drive system 2 and two drive axles 3 and 4, each having two drive wheels 5 and 6 or 7 and 8, respectively. Preferably the drive axle 4 is a front axle of the electric utility vehicle, whereas the drive axle 3 is a rear axle of the electric utility vehicle.

Here the two drive axles 3 and 4 are each coupled to the drive system 2, in such manner that for the drive axle 4 the connection is made by way of a drive output shaft 9 and a transmission 10, whereas the drive axle 3 is connected within the drive system 2.

Furthermore, the drive system 2 is provided with an auxiliary drive 11 in the form of a power take-off shaft 12, by way of which drive power can be supplied to a working device arranged on the electric utility vehicle.

Figure 2:
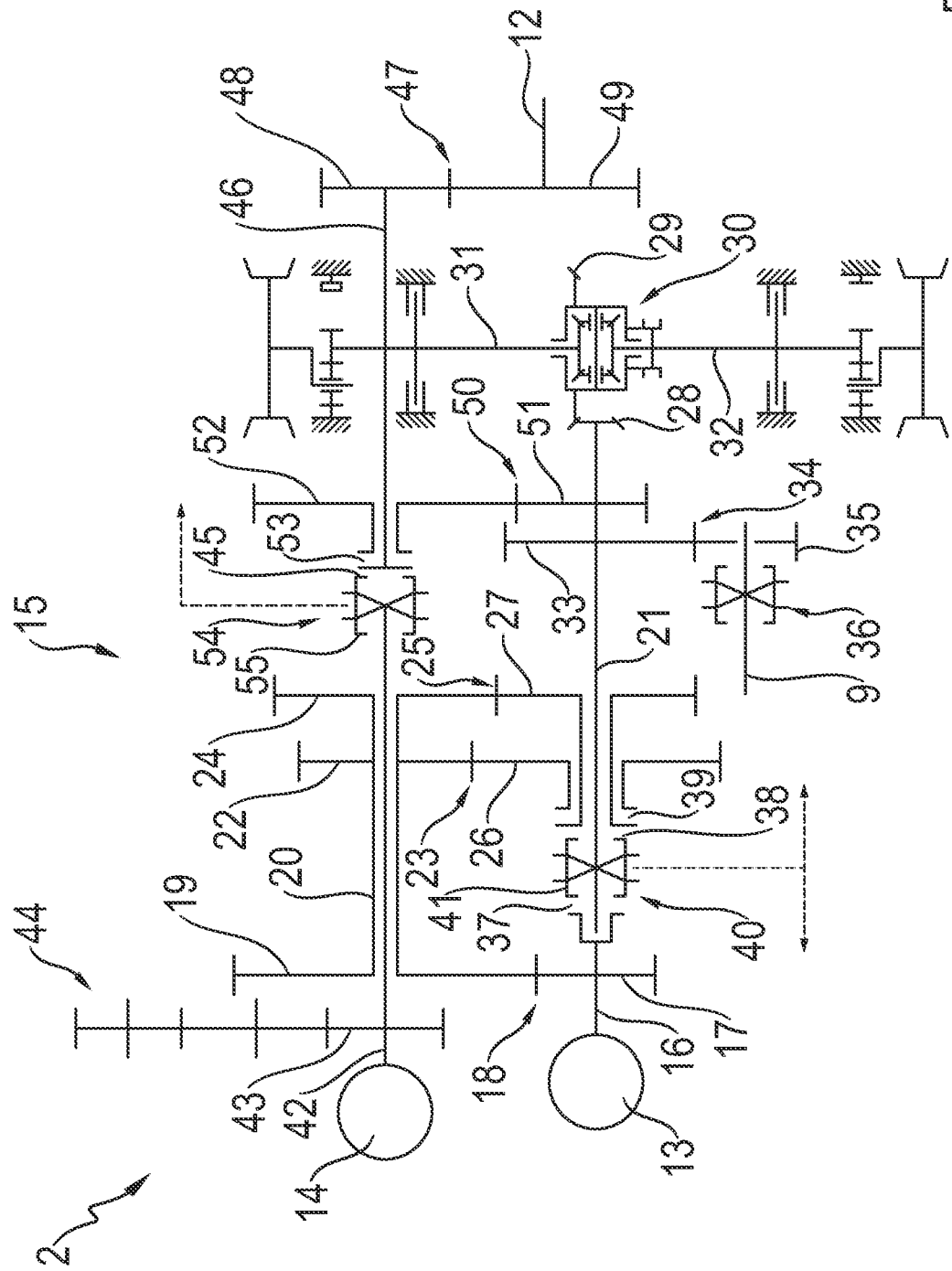
FIG. 2: A schematic representation of a drive system of the drive-train shown in FIG. 1, in accordance with a preferred embodiment of the invention.

FIG. 2 shows a schematic representation in the area of the drive system 2, which is designed in accordance with a preferred embodiment of the invention. In this case the drive system 2 comprises a first electric machine 13, a second electric machine 14 and an electric vehicle transmission 15 which in this case is in the form of a preferred possible design of the invention. The two electric machines 13 and 14 are each indicated only schematically and each consists—in a manner whose principle is known to those with a knowledge of the subject—of a rotor and a stator. The individual electric machines 13 and 14 can each be operated on the one hand as an electric motor and on the other hand as a generator.

In the present case—not illustrated here in greater detail—the rotor of the electric machine 13 is connected rotationally fixed to a first driveshaft 16 of the electric vehicle transmission 15, so that the rotor of the electric machine 13 and the first driveshaft 16 always rotate at the same speed. On the first driveshaft 16 a spur gear 17 of a spur gear stage 18 is arranged in a rotationally fixed manner, such that the spur gear 17 meshes within the spur gear stage 18 with a spur gear 19 which is arranged rotationally fixed on a countershaft 20. Accordingly, the first driveshaft 16 and the countershaft 20 are permanently coupled with one another by way of the spur gear stage 18. The countershaft 20 is here axially offset relative to the first driveshaft 16 and relative to a main drive output shaft 21 which latter is positioned coaxially with the first driveshaft 16.

Besides the spur gear 19 there are also arranged on the countershaft 20, in each case in a rotationally fixed manner, a spur gear 22 of a spur gear stage 23 and a spur gear 24 of a spur gear stage 25. The spur gear 22 meshes permanently with a spur gear 26 which, together with the spur gear 22 forms the spur gear stage 25 and is mounted rotatably on the main drive output shaft 21. In contrast, the spur gear stage 25 is formed by the permanent meshing of the spur gear 24 with a spur gear 27 which is also mounted rotatably on the main drive output shaft 21.

The main drive output shaft 21 carries at an axial end facing away from the first driveshaft 16 a bevel gear 28, which meshes with a drive input adjusting wheel 29 of a transverse differential 30. In this case the differential 30 is in the form of a bevel gear differential which can be locked and by means of which a distribution of a drive movement transmitted by the main drive output shaft 21 is passed on to driveshafts 31 and 32 of the drive axle 3. This distribution can take place with compensation of rotation speed differences between the driveshafts 31 and 32.

In addition, a spur gear 33 is arranged rotationally fixed on the main drive output shaft 21, which meshes permanently with a spur gear 35 in a spur gear stage 34. In this case the spur gear 35 can be fixed by means of a separator cutch 36 to the drive output shaft 9, which extends axially offset relative to the main drive output shaft 21. By actuating the separator clutch 36 the main drive output shaft 21 and the drive input shaft 9 are coupled to one another by means of the spur gear stage 34, whereby in addition a power flow is transmitted to the drive axle 4 and thereby realizes an all-wheel driving mode of the electric utility vehicle.

In the electric vehicle transmission 15 three gear-shifting elements 37, 38, and 39 are also provided, each in the form of an interlocking shifting element, which are therefore specifically unsynchronized claw-type shifting elements. When actuated, the gear-shifting element 37 connects the first driveshaft 16 rotationally fixed to the coaxially extending main drive output shaft 21, so that a fixed through-drive from the first driveshaft 16 and thus also the electric machine 13 to the main drive output shaft 21 takes place. In contrast, when actuated the gear-shifting element 38 connects the spur gear 27 to the main drive output shaft 21, whereby the main drive output shaft 21 is coupled to the first driveshaft 16 by way of the spur gear stages 18 and 25. Alternatively the first driveshaft 16 can also be coupled to the main drive output shaft 21 by way of the spur gear stages 18 and 23, for which purpose the gear-shifting element 39, which then fixes the spur gear 26 to the main drive output shaft 21, has to be closed.

Between the first driveshaft 16 and the main drive output shaft 21 there can accordingly be engaged a first gear by closing the gear-shifting element 38, a second gear by closing the gear-shifting element 39, and a third gear by closing the gear-shifting element 37. In each of the gears the electric machine 13 is coupled to the main drive output shaft 21 and thus also to the drive axle 3, and by additionally actuating the separator clutch 36 a coupling to the further drive axle 4 can be created.

In the present case the gear-shifting elements 37, 38, and 39 are combined in a shifting device 40 which comprises an actuation element 41. In particular this actuation element is in the form of a shifting sleeve and, besides a neutral position in which none of the gear-shifting elements 37, 38, and 39 is actuated, it can also be moved to three different shift positions of which in a first shift position the gear-shifting element 37, in a second shift position the gear-shifting element 38, and in a third shift position the gear-shifting element 39 is actuated.

As can also be seen from FIG. 2, the rotor of the electric machine 14—here not illustrated further—is connected rotationally fixed to a second driveshaft 42 of the electric vehicle transmission 15. This second driveshaft 42 is arranged coaxially with the countershaft 20, such that the said countershaft 20 is a hollow shaft that covers the driveshaft 42 axially and surrounds it radially.

On the second driveshaft 42 a spur gear 43 of a pump drive 44 is arranged in a rotationally fixed manner, so that via the pump drive 44 at least one hydraulic pump of the electric utility vehicle is permanently coupled to the second driveshaft 42 and thus also to the electric machine 14. At an end axially opposite the connection to the electric machine 14, the second driveshaft 42 can also be connected rotationally fixed by a shifting element 45 to an auxiliary driveshaft 46 which is arranged coaxially with the second driveshaft 42. This auxiliary driveshaft 46 is permanently coupled by a spur gear stage 47 to the power take-off shaft 12, since a spur gear 48 arranged rotationally fixed on the auxiliary driveshaft 46 meshes with a spur gear 49 which is positioned rotationally fixed on the power take-off shaft 12.

As a special feature, alternatively to being connected rotationally fixed to the auxiliary driveshaft 46, the second driveshaft 42 can also be coupled with the main drive output shaft 21. For that purpose, a spur gear stage 50 is provided, which consists of two spur gears 51 and 52 which are permanently engaged with one another. The spur gear 51 is arranged rotationally fixed on the main drive output shaft 21 between the spur gear 33 and the bevel gear 28, whereas the spur gear 52 is mounted rotatably on the auxiliary driveshaft 46. In this case the spur gear 52 can be connected rotationally fixed to the second driveshaft 42, whereby the second driveshaft 42 and the main drive input shaft 21 are coupled with one another by means of the spur gear stage 50.

In the present case the two shifting elements 45 and 53 are each in the form of interlocking shifting elements, so both the shifting element 45 and the shifting element 53 are unsynchronized claw-type shifting elements. The two shifting elements 45 and 53 are combined in a shifting device 54, which by means of its actuation element 55 is moved from a neutral position, depending on the direction of movement, such that either the shifting element 45 or the shifting element 52 is in its respective actuated condition. In the present case the shifting element 55 is preferably in the form of a shifting sleeve.

Figure 3:
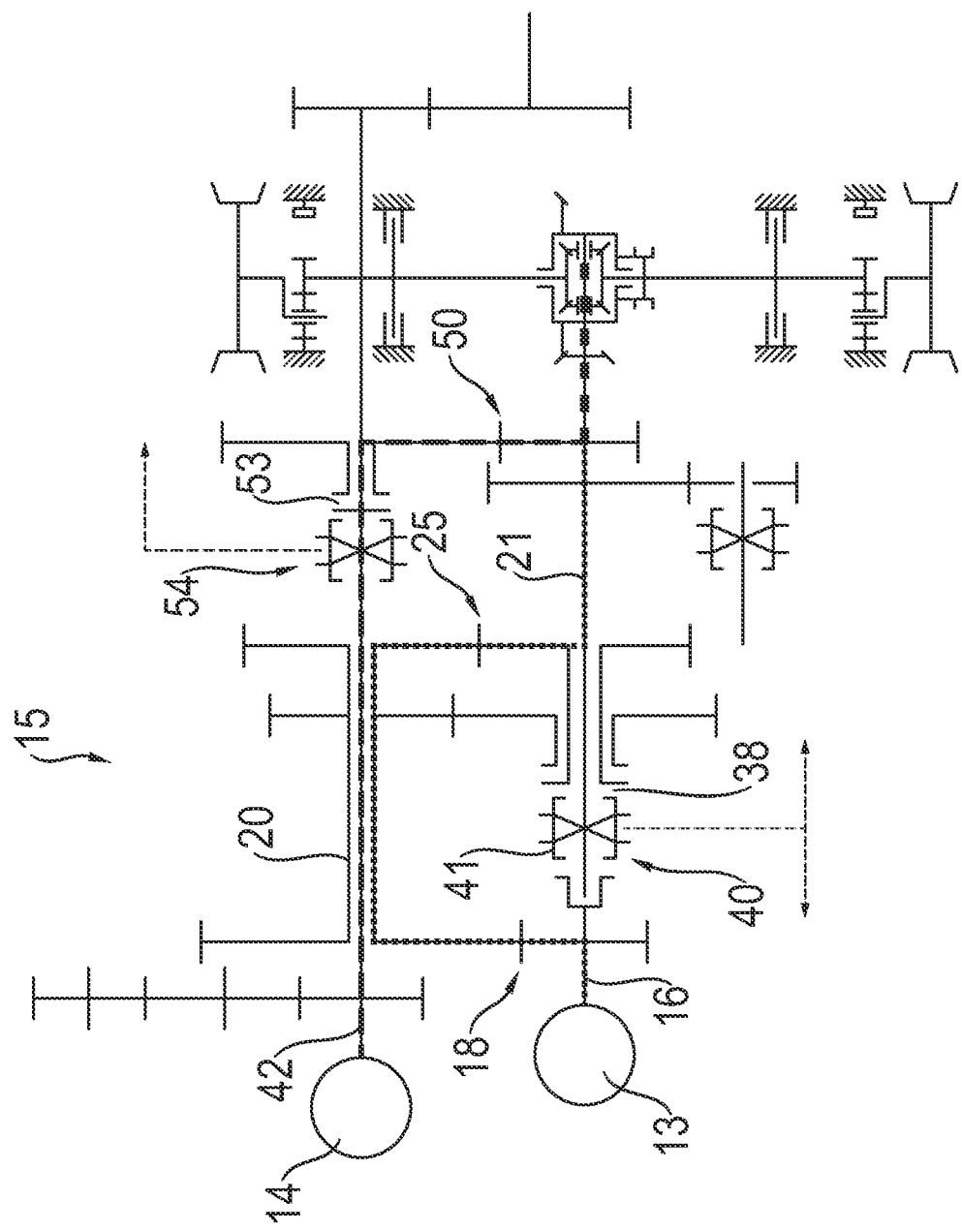
FIGS. 3 to 7: Schematic views of various shift conditions of an electric vehicle transmission of the drive system shown in FIG. 2.

FIGS. 3 to 7 show various shift conditions of the electric vehicle transmission 15. For example, FIG. 3 shows a shift condition in which, between the first driveshaft 16 and the main drive output shaft 21, the first gear has been engaged by closing the gear-shifting element 38 by means of the actuation element 41 of the shifting device 40. This creates a power flow from the electric machine 13, via the first driveshaft 16 and by way of the spur gear stage 18, to the countershaft 20 from where the power flow then passes farther on via the spur gear stage 25 to the main drive output shaft 21. At the same time the shifting element 53 in the shifting device 54 is actuated, whereby the second driveshaft 42 as well, and thus also the electric machine 14, is coupled by means of the spur gear stage 50 to the main drive output shaft 21. In that way a common drive of the electric utility vehicle can take place when the electric machines 13 and 14 are operated as electric motors, wherein the electric machine 14 can assist the electric machine 13 in providing that drive. Furthermore, when the electric machines 13 and 14 are operated as generators, common braking of the electric utility vehicle can take place.

Figure 4:
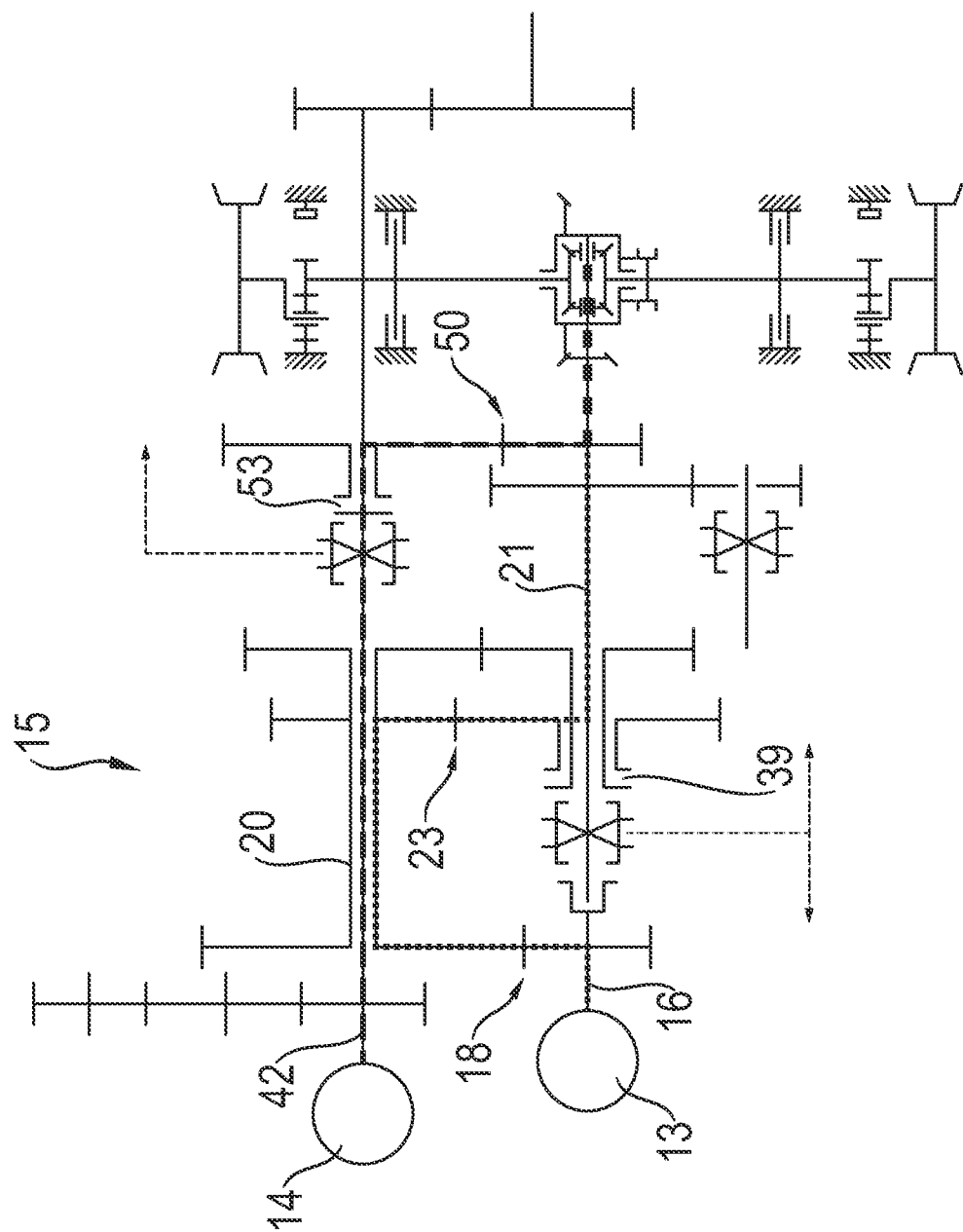

In the shift condition shown in FIG. 4, in contrast, the second gear is engaged between the first driveshaft 16 and the main drive output shaft 21 by closing the gear-shifting element 39, whereby, otherwise than the shift condition in FIG. 3, a power flow from the countershaft 20 to the main drive output shaft 21 takes place by way of the spur gear stage 23. Accordingly, the first driveshaft 16 and thus also the electric machine 13 are coupled to the main drive output shaft 21 by way of the spur gear stages 18 and 23. Again, the second driveshaft 42 and thus also the electric machine 14 are connected by means of the spur gear stage 50 to the main drive output shaft 21 by closing the shifting element 53. Thus, the electric machine 14 can assist the electric machine 13 for providing drive power or also during braking of the electric utility vehicle.

Figure 5:
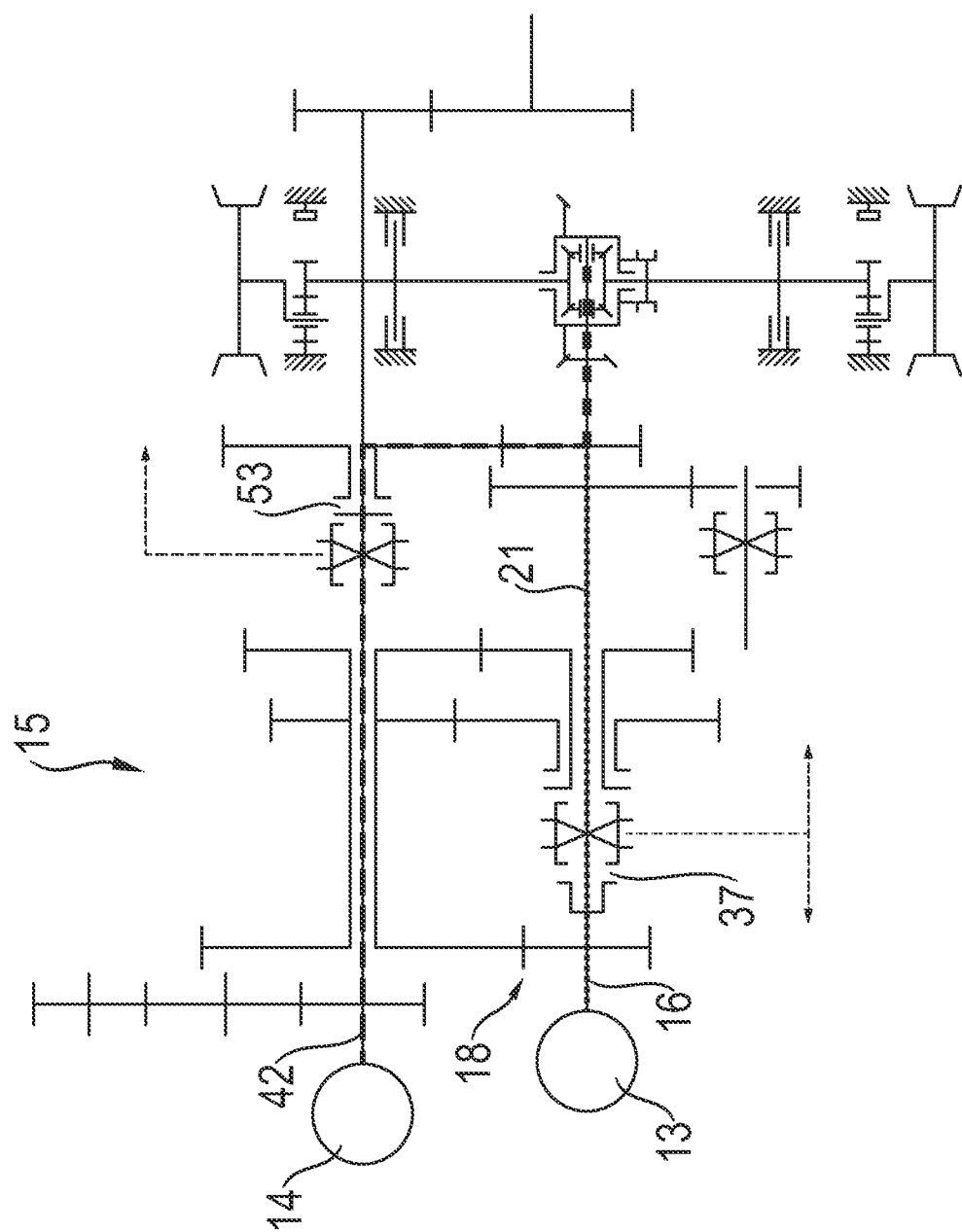

FIG. 5 shows a further shift condition of the electric vehicle transmission 15, wherein in this case, otherwise than in the two conditions in FIGS. 3 and 4, the gear-shifting element 37 is now closed, so that from the first driveshaft 16 a fixed through-drive to the main drive output shaft 21 is produced by engaging the third gear. Again, the electric machine 13 can be assisted by the electric machine 14 in driving or braking the electric utility vehicle, since by closing the shifting element 53 the electric machine 14 is likewise coupled via the second driveshaft 42 to the main drive output shaft 21.

A change between the gears that can be engaged between first driveshaft 16 and the main drive output shaft 21 can be carried out in such manner that when shifting between the gear-shifting elements 37 to 39 during a shifting operation from a current gear to a target gear with the accompanying interruption of the traction force between the driveshaft 16 and the main drive output shaft 21, the traction force is supported by the electric machine 14. This is possible because by way of the second driveshaft 42, the electric machine 14 is coupled by the spur gear stage 50 to the main drive output shaft 21.

During a shared drive input to the electric utility vehicle by the electric machines 13 and 14, the electric machine 14 is controlled in such manner that additional, rotation-speed-synchronous drive torque is contributed by the electric machine 14 to the main drive output shaft 21.

Figure 6:
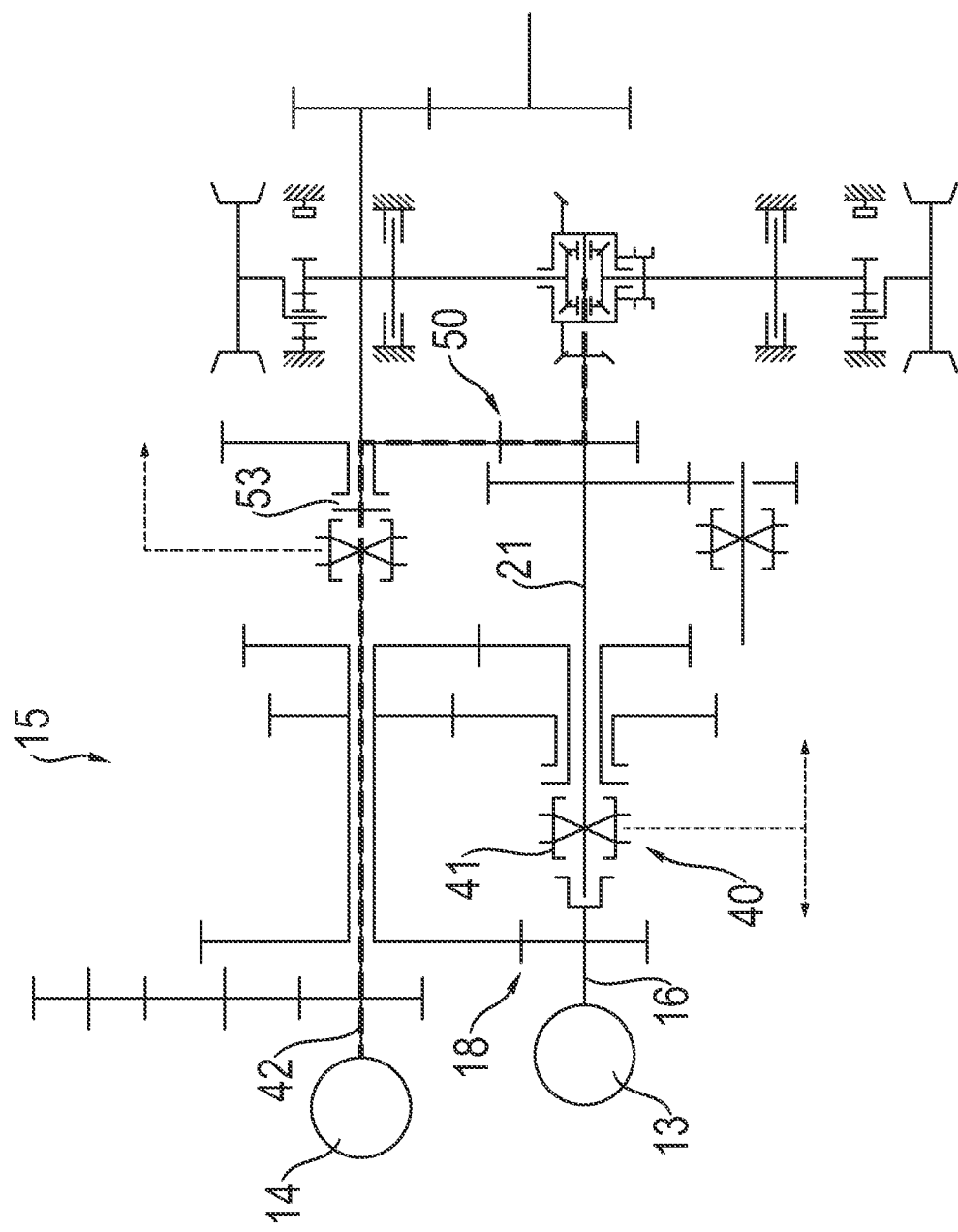

In contrast, in the shift condition shown in FIG. 6 the electric utility vehicle is powered or braked exclusively by the electric machine 14, since in this case only the shifting element 53 is closed and thus also only the electric machine 14 is coupled by way of the second driveshaft 42 to the main drive output shaft 21. On the other hand, the first driveshaft 16 and thus also the electric machine 13 is decoupled from the main drive output shaft 21 by moving the actuation element 41 of the shifting device 40 to its neutral position. Just as well, however, exclusive driving or exclusive braking of the electric utility vehicle by the electric machine 13 in one of the gears, as shown in FIGS. 3 to 5, can take place since in the closed condition of one of the gear-shifting elements 37 to 39 the shifting element 53 is not actuated at the same time.

Figure 7:
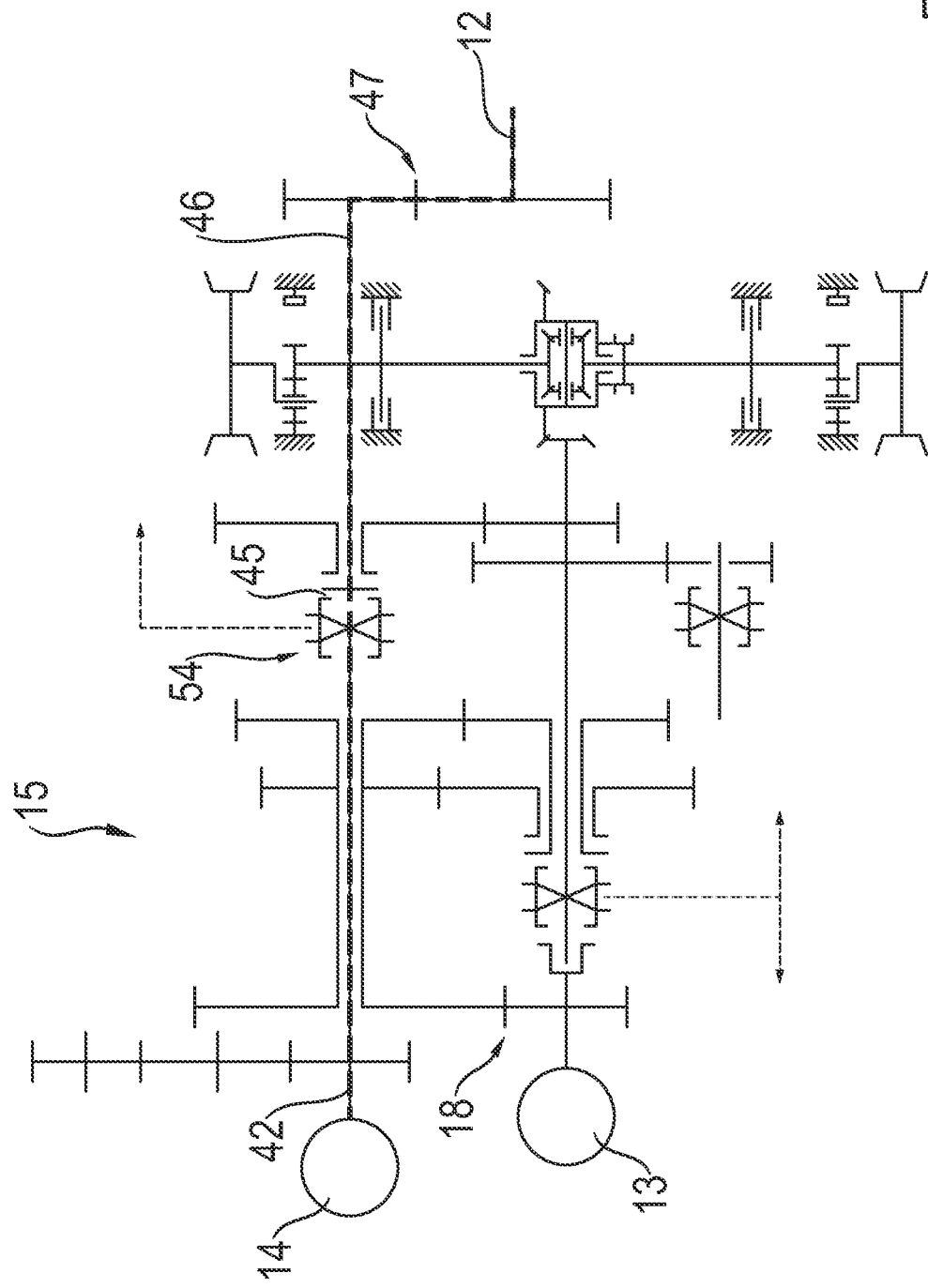

Finally, FIG. 7 shows a shift condition of the electric vehicle transmission 15 in which the power take-off shaft 12 is operated by means of the electric machine 14. For this, the shifting element 45 of the shifting device 54 is actuated so that starting from the electric machine 14, a power flow takes place via the second driveshaft 42 to the auxiliary driveshaft 46 and thereafter via the spur gear stage 47 to the power take-off shaft 12. By correspondingly controlling the electric machine 14, without intermediate shifts of a separate power take-off shaft transmission, the usually necessary operating stages of the power take-off shaft 12 in the form of a normal stage and an eco-stage at 5040 r/min and a normal stage and an eco-stage at 1000 r/min can be obtained. In parallel, the electric utility vehicle can be powered or braked by the electric machine 13 in a shiftable gear.

By virtue of the design of an electric vehicle transmission in accordance with the invention, a suitable integration of electric machines for driving an electric utility vehicle and for operating a power take-off of this electric utility vehicle can be achieved.

INDEXES

1 Drive-train
2 Drive system
3 Drive axle
4 Drive axle
5 Drive wheel
6 Drive wheel
7 Drive wheel
8 Drive wheel
9 Drive output shaft
10 Transmission
11 Auxiliary drive
12 Power take-off shaft
13 Electric machine
14 Electric machine
15 Electric vehicle transmission
16 Driveshaft
17 Spur gear
18 Spur gear stage
19 Spur gear
20 Countershaft
21 Main drive output shaft
22 Spur gear
23 Spur gear stage
24 Spur gear
25 Spur gear stage
26 Spur gear
27 Spur gear
28 Bevel gear
29 Drive input adjusting wheel
30 Transverse differential
31 Driveshaft
32 Driveshaft
33 Spur gear
34 Spur gear stage
35 Spur gear
36 Separator clutch
37 Gear-shifting element
38 Gear-shifting element
39 Gear-shifting element
40 Shifting device
41 Actuation element
42 Driveshaft
43 Spur gear
44 Pump drive
45 Shifting element
46 Auxiliary driveshaft
47 Spur gear stage
48 Spur gear
49 Spur gear
50 Spur gear stage
51 Spur gear
52 Spur gear
53 Shifting element
54 Shifting device
55 Actuation element

The invention claimed is:

1. An electric vehicle transmission for an electric utility vehicle, the electric vehicle transmission comprising:
a first driveshaft configured to be coupled to a first electric machine;
a main drive output shaft configured to be coupled to at least one drive axle;
at least one gear-shifting element, the respective actuation of which couples the first driveshaft with the main drive output shaft by way of a gear;
a second driveshaft configured to be coupled to a second electric machine, and the second driveshaft is connectable to an auxiliary driveshaft such that, when connected, the second driveshaft and the auxiliary driveshaft are rotationally fixed to each other;
a shifting element, which when actuated couples the second driveshaft to the main drive output shaft; and
a separator clutch, a drive output shaft, and at least one further drive axle, wherein the main drive output shaft is configured be coupled to the drive output shaft by way of the separator clutch, wherein the separator clutch forms a coupling with the at least one further drive axle.

2. The electric vehicle transmission according to claim 1, wherein when actuated, the shifting element connects the second driveshaft in a rotationally fixed manner to a first spur gear which meshes with a second spur gear, and wherein the second spur gear is coupled to the main drive output shaft.

3. The electric vehicle transmission according to claim 1, wherein the shifting element is a first shifting element and further comprising a second shifting element, wherein the first shifting element is combined with the second shifting element to form a shifting device, by an actuation element of which the shifting device is changeable from a neutral position to a first position to actuate the first shifting element and to a second position to actuate the second shifting element, wherein when actuated, the second shifting element couples the second driveshaft to the auxiliary driveshaft.

4. The electric vehicle transmission according to claim 1, wherein the shifting element and/or an individual gear-shifting element of the at least one gear-shifting element is in the form of a claw-type shifting element.

5. The electric vehicle transmission according to claim 1, further comprising a transverse differential, wherein the main drive output shaft is coupled to the transverse differential.

6. A drive system for an electric utility vehicle, the drive system comprising the electric vehicle transmission according to claim 1, the first electric machine, and the second electric machine, wherein a rotor of the first electric machine is coupled to the first driveshaft of the electric vehicle transmission and a rotor of the second electric machine is coupled to the second driveshaft.

7. An electric utility vehicle comprising a drive system according to claim 6.

8. A method for operating a drive system according to claim 6, the method comprising:
actuating the at least one gear-shifting element of the electric vehicle transmission thereby coupling the first electric machine to the main drive output shaft with an associated gear engaged; and
actuating the shifting element, during the coupling of the first electric machine to the main drive output shaft with the associated gear engaged, thereby coupling the second electric machine to the main drive output shaft.

9. The method according to claim 8, comprising controlling the second electric machine during the course of coupling the first electric machine to the main drive output shaft in the associated gear, and from a time of actuating the shifting element, in such manner that the second electric machine contributes a rotation-speed-synchronous drive torque to the main drive output shaft.

10. An electric vehicle transmission for an electric utility vehicle, the electric vehicle transmission comprising:
a first driveshaft configured to be coupled to a first electric machine;
a main drive output shaft configured to be coupled to at least one drive axle;
at least one gear-shifting element, the respective actuation of which couples the first driveshaft with the main drive output shaft by way of a gear;
a second driveshaft configured to be coupled to a second electric machine and further configured to be coupled to an auxiliary driveshaft;
a shifting element, which when actuated couples the second driveshaft to the main drive output shaft; and
a countershaft and wherein the at least one gear-shifting element comprises:
a first gear-shifting element, which when actuated connects the first driveshaft to be rotationally fixed to the main drive output shaft; and
at least one further gear-shifting element having a closed condition in which a power flow takes place from the first driveshaft via the countershaft to the main drive output shaft by way of one or more spur gear stages and with the engagement of an associated gear.

11. The electric vehicle transmission according to claim 10, wherein the at least one gear-shifting element further comprises a second gear-shifting element and a third gear-shifting element, wherein the countershaft is coupled permanently by way of a first spur gear stage to the first driveshaft; wherein when the second gear-shifting element is actuated, the countershaft is couplable to the main drive output shaft via a second spur gear stage and, by closing the third gear-shifting element, by means of a third spur gear stage.

12. The electric vehicle transmission according to claim 11, wherein:
a first gear between the first driveshaft and the main drive output shaft is obtained by closing the second gear-shifting element,
a second gear between the first driveshaft and the main drive output shaft is obtained by actuating the third gear-shifting element, and
a third gear between the first driveshaft and the main drive output shaft is obtained by closing the first gear-shifting element.

13. The electric vehicle transmission according to claim 11, wherein the first gear-shifting element, the second gear-shifting element, and the third gear-shifting element are combined to form a shifting device, whose actuation element is operable between a neutral position and a plurality of shift positions, wherein each of the plurality of shift positions is associated with an actuation of one of the at least one gear-shifting elements.

14. The electric vehicle transmission according to claim 10, wherein the countershaft is arranged coaxially with the second driveshaft.

15. A method of operating an electric utility vehicle drive system, comprising:
providing a first electric machine;
providing a second electric machine;
providing an electric utility vehicle having a transmission comprising:
a first driveshaft configured to be coupled to the first electric machine;
a main drive output shaft configured to be coupled to at least one drive axle;
a countershaft;
one or more spur gear stages;
one or more gears;
gear-shifting elements, which when actuated connects the first driveshaft rotationally fixed to the main drive output shaft, wherein some of the gear-shifting elements have a closed condition in which a power flow takes place from the first driveshaft via the countershaft to the main drive output shaft by way of the one or more spur gear stages and with the engagement of an associated gear of the one or more gears;
a second driveshaft configured to be coupled to the second electric machine and further configured to be coupled to an auxiliary driveshaft; and a shifting element, which when actuated couples the second driveshaft to the main drive output shaft;

wherein respective actuation of the first gear-shifting element and the at least one further gear-shifting element couples the first driveshaft with the main drive output shaft;

closing the shifting element, resulting in one of the one or more gears between the first electric machine and the main drive output shaft;

providing support for a traction force by way of the second electric machine;

changing between the one or more gears; and switching between the gear-shifting elements;

wherein closing the shifting element and providing the support is performed during the course of changing between the one or more gears and switching between the gear-shifting elements.

* * * * *